US012618728B2

(12) United States Patent
Pierre et al.

(10) Patent No.: US 12,618,728 B2
(45) Date of Patent: May 5, 2026

(54) OPTICAL PRESSURE SENSOR

(71) Applicant: Politecnico di Milano, Milan (IT)

(72) Inventors: Garbo Pierre, Milan (IT); Andrea Zanoni, Milan (IT); Alberto Lavatelli, Milan (IT); Giuseppe Quaranta, Milan (IT)

(73) Assignee: Politecnico di Milano (IT)

( * ) Notice: Subject to any disclaimer, the term of this patent is extended or adjusted under 35 U.S.C. 154(b) by 242 days.

(21) Appl. No.: 18/553,095

(22) PCT Filed: Mar. 8, 2022

(86) PCT No.: PCT/IB2022/052048
§ 371 (c)(1),
(2) Date: Sep. 28, 2023

(87) PCT Pub. No.: WO2022/208193
PCT Pub. Date: Oct. 6, 2022

(65) Prior Publication Data

US 2024/0183726 A1 Jun. 6, 2024

(30) Foreign Application Priority Data

Mar. 30, 2021 (IT) ........................ 102021000007781

(51) Int. Cl.
*G01L 1/24* (2006.01)
*G01L 5/22* (2006.01)

(52) U.S. Cl.
CPC ................ *G01L 1/24* (2013.01); *G01L 5/223* (2013.01)

(58) Field of Classification Search
CPC .............. G01L 1/24; G01L 5/22; G01L 5/223
See application file for complete search history.

(56) References Cited

U.S. PATENT DOCUMENTS 4,733,068 A 3/1988 Thiele
9,274,025 B2 * 3/2016 Okoli ................ G02B 6/02033
(Continued)

FOREIGN PATENT DOCUMENTS

DE 10039094 C1 * 2/2002 ............ G01P 15/093
WO 20100048911 A1 5/2010

OTHER PUBLICATIONS

International Search Report, dated Jun. 27, 2022, 3 pages.
Written Opinion from the ISA, dated Jun. 27, 2022, 8 pages.

*Primary Examiner* — Octavia Hollington
(74) *Attorney, Agent, or Firm* — Widerman Malek, PL; Mark Malek

(57) ABSTRACT

An optical pressure sensor including an optical radiation source and an optical guide that may be optically coupled to the radiation source and may be configured to obtain a total internal reflection condition. The optical guide may define an interface wall. The sensor may also include an element elastically deformable and transparent to optical radiation that has a face facing said interface wall and configured so that a pressure exerted on the deformable element changes a contact area with the interface wall so that the optical guide assumes a frustrated total internal reflection condition with emission of an output optical radiation towards the first face of the deformable element dependent on the exerted pressure. The sensor may further include a photoresistor optically coupled to the second face of the deformable element and configured to provide an electrical signal dependent on the output optical radiation.

13 Claims, 4 Drawing Sheets

(56) References Cited

U.S. PATENT DOCUMENTS

| | | | | |
|---|---|---|---|---|
| 9,880,653 | B2 * | 1/2018 | Baharv | ................. G06F 3/0428 |
| 2020/0033953 | A1 | 1/2020 | Chen | |
| 2020/0158544 | A1 | 5/2020 | Harnett | |

* cited by examiner

OPTICAL PRESSURE SENSOR

RELATED APPLICATIONS

This application is a national phase application of, and claims priority under 35 U.S.C. § 371 to PCT application serial No. PCT/IB2022/052048, filed on Mar. 8, 2022 and titled OPTICAL PRESSURE SENSOR, which, in turn, claims priority to Italian Patent Application No. 102021000007781 filed on Mar. 30, 2021 and titled Sensore di pressione ottico. The contents of each of these applications are incorporated herein by reference except for where the content therein conflicts with the content herein.

TECHNICAL FIELD

The present invention relates to optical pressure sensors, and in particular to sensors that operate based on the phenomenon of frustrated total internal reflection.

STATE OF THE ART

As known, Total Internal Reflection (TIR) indicates the complete reflection of electromagnetic radiation within a material, in the presence of an interface with another material. The phenomenon occurs if the angle of incidence is greater than a certain limiting angle, called the critical angle, depending on the refractive indices of the two interfaced materials, according to Snell's law.

Although in a TIR condition the radiation is basically completely reflected, there is a part of the electromagnetic field that crosses the interface. This field does not propagate but decays very quickly with distance from the interface.

However, in the presence of another material within this distance, with a refractive index at least equal to that of the first material, some of the radiation may propagate again and the reflection will not be complete. In this case we speak of frustrated total internal reflection (in English, Frustrated TIR).

The paper S. Zhu, A. Yu, D. Hawley, and R. Roy "Frustrated total internal reflection: a demonstration and review", American Journal of Physics, vol 54, no. 7, pp. 601-607, 1986, provides a theoretical description of the FTIR phenomenon.

The paper A. Lavatelli, A. Zanoni, E. Zappa, A. Cigada, "On the Design of Force Sensors Based on Frustrated Total Internal Reflection," IEEE Transactions on Instrumentation and Measurements, vol. 68, no. 10, pp 4065-4074, 2019, describes among others, an experiment documenting the behavior of the FTIR phenomenon at the micromechanical level and proposes a Greenwood-Williamson (GW) model as a tool to predict the response of an FTIR-based pressure sensor.

The paper J. Castillo, A. P. D. L. Blanca, J. A. Cabrera, A. Simón, "An optical tire contact pressure test bench," Vehicle System Dynamics, vol 44, no. 3, pp. 207-221, 2006, describes an optical test bench for tire contact pressure measurement.

U.S. Pat. No. 9,880,653 describes a pressure-sensitive tactile system consisting of a transparent sheet, with a light source and detector arranged along perimeter of the transparent sheet.

SUMMARY OF THE INVENTION

The present invention addresses the problem of providing an optical pressure sensor, based on the FTIR phenomenon, which is an alternative to known ones and which, in particular, is not limited to the measurement of pressures exerted on large surfaces but allows its miniaturization.

The present invention relates to an optical pressure sensor as defined by independent claim 1 and particular embodiments thereof, as defined by dependent claims 2, and 4-13.

BRIEF DESCRIPTION OF THE DRAWINGS

The present invention is hereinafter described in detail, by way of example but not limitation, with reference to the accompanying drawings, wherein.

DETAILED DESCRIPTION

In this description, similar or identical items or components will be referred to in the figures by the same identifying symbol.

Figure 1:
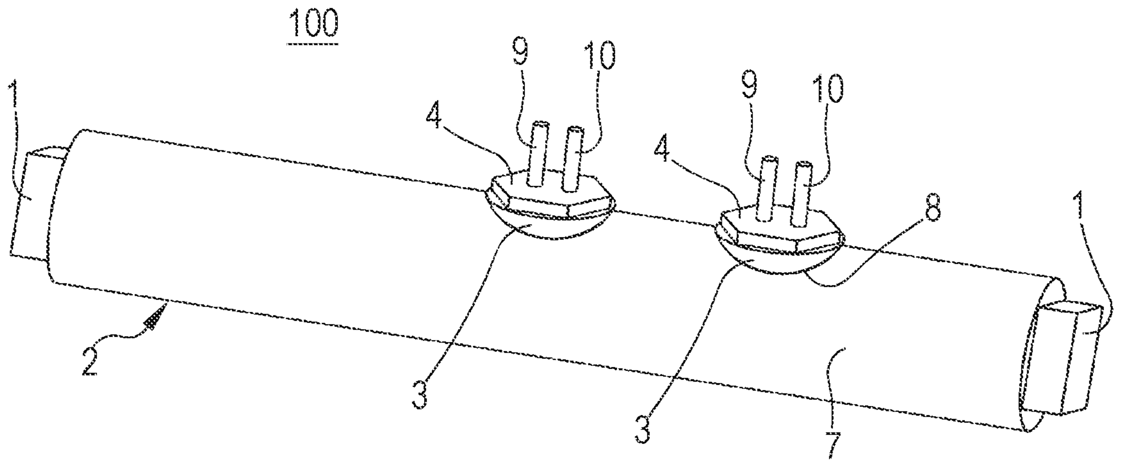
FIG. 1 shows an example of an optical pressure sensor comprising an optical guide and a load cell with two photoresistors and two elastically deformable and transparent elements.

FIG. 1 shows an example of an optical pressure sensor 100 operating according to the principle of frustrated total internal reflection.

The optical pressure sensor 100 (hereinafter, for brevity, "optical sensor") includes at least one optical radiation source 1, an optical guide 2, at least one elastically deformable element 3, and at least one photoresistor 4.

In accordance with the particular embodiment described herein, the sensor 100 is such that it generates an electrical signal dependent on the pressure exerted by the hand of a user.

According to the example described herein, there are two optical radiation sources 1 each configured to operate at wavelengths that may be chosen depending on the application.

In particular, each optical source 1 is realized by means of a corresponding LED (Light Emitting Diode), housed in a corresponding adapter 6. The adapter 6, in addition to acting as a housing, allows the electrical connection between an electrical power source and the corresponding LED 1. In accordance with an example, the LED 1 emits at a wavelength of blue. It is not excluded that the optical source 1 may emit in frequency bands outside of the visible range such as, for example, infrared or ultraviolet.

According to a preferred form of implementation, the optical guide 2 is a solid body, for example cylindrical in shape. In particular, the two optical sources 1 are coupled to the ends of the cylindrical optical guide 2. For example, the optical guide 2 is immersed in air.

The material with which the optical guide 2 is made is chosen so that a total internal reflection condition can be obtained for the radiation emitted by the sources 1. The total internal reflection condition is also obtained by appropriately designing the inclination of the radiation beam emitted by the optical sources 1 with respect to the axis of the optical guide 2.

For example, considering LED sources 1 operating at wavelengths of blue, the cylindrical optical guide 2 is realizable in plexiglass, a material having a refractive index $n_1$ with respect to air of about 1.5. The optical guide 2 defines an outer wall 7, which corresponds to an interface surface with the surrounding air.

Alternatively to the cylindrically shaped Plexiglas guide, other types of optical guides could also be used. Preferably, the optical guide 2 can be made of a material having the following properties:

(A) Transparency, i.e., a non-zero transmissivity, preferably, greater than 70%;

B) Stiffness: the material of the optical guide 2 does not deform when subjected to the pressure to be measured;

C) Refractive index greater than that of air (or the fluid in which the sensor 100 is immersed).

Note that a material such as, for example, glass is suitable for use in making the optical guide 2.

With reference to the shape of the optical guide 2, it should be noted that in order not to lose the total internal reflection condition, the optical guide 2 has a shape that has no edges except at the end portions. Therefore, the most suitable shapes are cylinder shapes or its deformations such as, for example, prisms with an elliptical base even irregular.

The optical guide 2 can also have a non-rectilinear axis: small curvatures with respect to the length are permissible, as they do not damage the total internal reflection condition.

With reference to the elastically deformable element 3, it should be noted that it is deformable under the action of a pressure and that it brings into contact with the optical guide 2 and regains its initial shape when this pressure ends. The elastically deformable element 3 has an elastic modulus appropriate for the type of application. Considering the case in which the pressure exerted by a user's hands is measured, the elastically deformable element 3 has an elastic modulus such that it is deformable for manually exerted pressures.

Furthermore, the elastically deformable element 3 is such that it is transparent to optical radiation emitted by the optical source 1. By the term "transparent" is meant a non-zero transmissivity, preferably, greater than 70%.

In accordance with the described example, the elastically deformable element 3 is made of silicone rubber and has a refractive index with respect to air $n_2$ of about 1.4.

As will be made clear later, the elastically deformable element 3 is such that, in the presence of a pressure exerted on the element itself, it changes a respective contact area with the outer wall 7 of the optical guide 2, so as to originate a condition of frustrated total internal reflection. In this condition, there occurs the emission from the optical guide 2 of an optical output radiation which passes through the elastically deformable element 3.

In particular, as can be seen in FIG. 1, the sensor 100 described comprises two elastically deformable elements 3 which are substantially equal to each other. According to one example, each of said elastically deformable elements 3 has a hemispherical shape and identifies a first face 8 (in the example, a spherical cap) facing the wall 7 of the optical guide 2 and an opposite second (flat) face, not shown in the figures.

Each elastically deformable element 3 is associated with a corresponding photoresistor 4 which is attached to the second face of the element 3 itself, by means of an adhesive layer. Advantageously, the deformable element 3 covers an input optical port of the photoresistor 4 so that said photoresistor can be invested by the radiation escaping from the optical guide 2 and not by that of the surrounding environment.

It should be noted that, as already described, the optical guide 2, in any of its embodiments, is such that it is rigid, i.e., non-deformable due to the pressures exerted on it by the elastically deformable element 3. With respect to non-deformability, conventional optical fibers are not preferred for use in the sensor 100.

For example, considering the application relating to manually exerted pressure, the elastically deformable element 3 has a diameter of between 8.00 and 5.00 mm and a total height of between 2.00 and 5.00 mm. The diameter is chosen so that the elastically deformable element 3 can cover the entire photoresistor 4, and its height is such as to result in a wide range of pressure detection.

As known, the photoresistor is an electronic component whose resistance is dependent (in particular, inversely proportional) to the amount of optical radiation that strikes it. In particular, the value of its resistance decreases as the intensity of the radiation that strikes it increases so that the electric current flowing through this component is proportional to the intensity of the radiation.

The photoresistor 4 is arranged to receive the output optical radiation escaping from the optical guide 2 when frustrated total internal reflection conditions occur.

The photoresistors 4 and associated elastically deformable elements 3 may be encompassed in a support structure so as to provide a load cell on which hand pressure may be exerted and, accordingly, be moved closer to or away from the optical guide 2. An example of such a load cell will be described later.

Each photoresistor 4 is electrically connected between a first electrical terminal 9 and a second electrical terminal 10, to which corresponding electrical conductors are connected. The photoresistor 4 is such that it provides the electrical terminals 9 and 10 with an electrical signal (typically a voltage) that is dependent on the optical radiation that has hit the photoresistor.

More in detail, the electrical conductors connect the electrical terminals 9 and 10 to an electronic processing circuit (not shown in FIG. 1) configured to provide a readout signal to the photoresistor 4 and receive the electrical signal (i.e., an electrical voltage) dependent on the optical radiation that has hit the photoresistor 4. Further, the electronic circuit is such that it processes this electrical signal received from the photoresistor 4 and measures an electrical parameter (the voltage drop across the photoresistor 4) that depends on the pressure exerted. The electronic circuit may further associate with this measured electrical parameter (e.g., after an analog-to-digital conversion) an information of interest for the specific application of the sensor 100.

Such information of interest may be the same value of the pressure exerted on the sensor 100 or the value of another quantity that is associated with the pressure exerted on the load cell of the sensor 100 according to a predetermined mode of correlation between such pressure and the information of interest. As will be clarified by a subsequent example, said quantity of interest may be, non-limitingly, a force exerted by the hand, a speed or an angle indicative of a direction of travel or an inclination required for a vehicle maneuvered by means of the sensor 100.

Such electronic circuitry may be integrated into the same container in which the components shown in FIG. 1 are housed, or may be external to the container.

It should be noted that, advantageously, a calibration is performed for each combination of photoresistor 4 and radiation source 1 so that the sensor can operate correctly in the range of pressure values of interest, generating an absolute measurement.

Note that, preferably, the sensor 100 is configured so that each elastically deformable element 3 is in contact with the optical guide 2 even in the absence of exerted pressure and thus in the condition of total internal reflection.

In the operation of the sensor 100, when a user exerts manual pressure on the load cell and thus on the hexastatically deformable elements 3 these change their relative contact area with the wall 7 of the optical guide 2 depending on the exerted pressure.

With the contact of the wall 7 of the guide 2 with the elastically deformable elements 3, there is a switch from a total internal reflection (TIR) to a total frustrated internal reflection (FTIR) situation and thus a transmitted radiation is generated which escapes from the optical guide 2 and, passing through the elastically deformable elements 3, affects the photoresistors 4. For each elastically deformable element 3, the portion of radiation transmitted externally to the optical guide 2 is proportional to the contact area between the external part 7 of the optical guide 2 and said element 3. This contact area increases with increasing hand pressure exerted by the user as the elastically deformable element 3 is increasingly pressed against the outer wall 7.

The photoresistors 4 vary their resistance as a function of the radiation passing through them. The electronic circuit connected to the photoresistors 4 can trace the voltage drop across the photoresistor 4 or the resistance of the photoresistor and then after appropriate processing provide the information of interest for the particular application.

When the hand pressure ceases, the load cell and thus each elastically deformable element 3 moves away from the outer wall 7 of the optical guide 2, reducing the contact area until the initial condition of total internal reflection is re-established.

Figure 2:
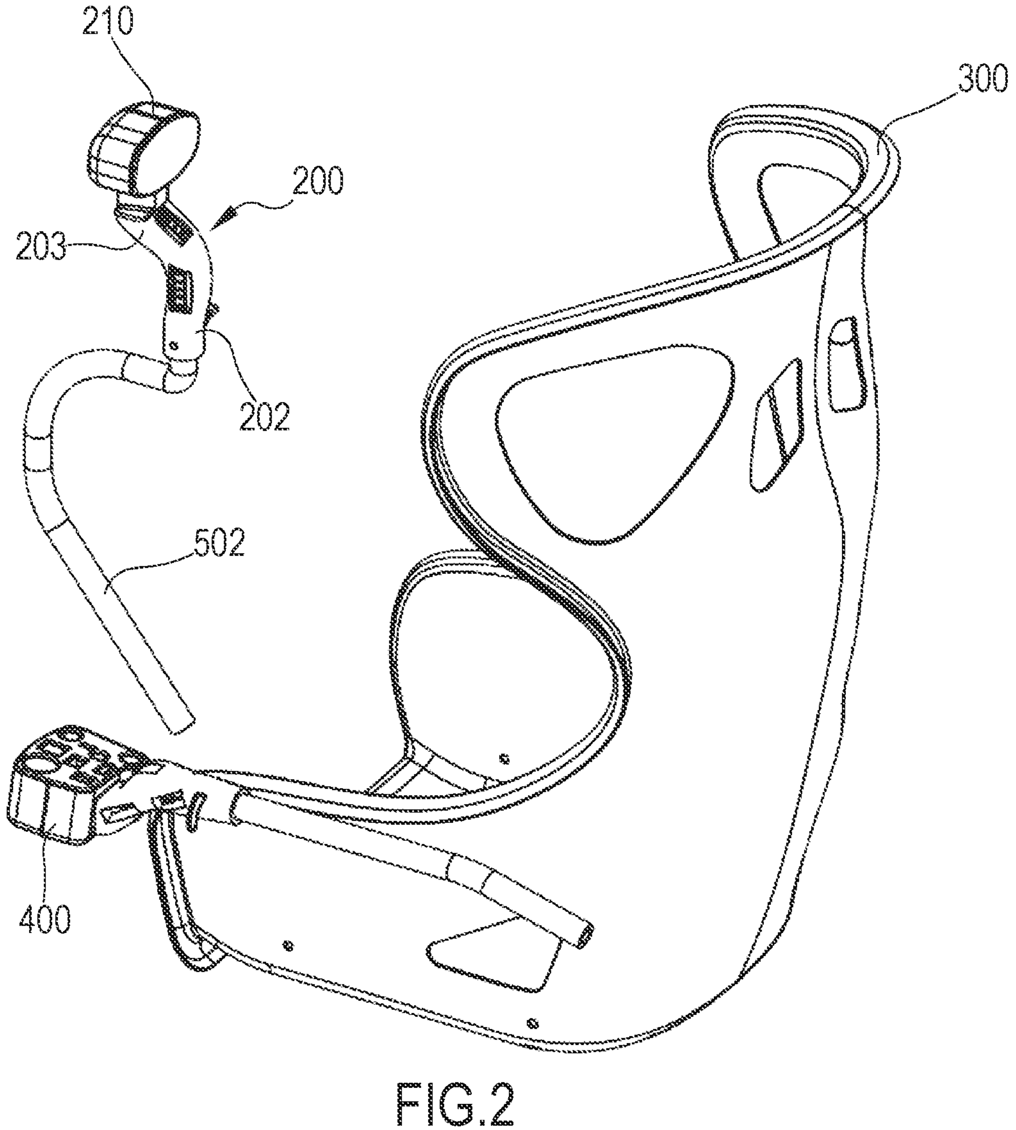
FIG. 2 refers to another example of said optical sensor implemented as a control rod of a helicopter or a driving simulator system.

The following description relates to a particular form of sensor actuation 100 that takes the form of a control stick 200 for a helicopter or helicopter driving simulator. FIG. 2 shows, in addition to the control stick 200, a chair 300 on which a pilot can sit while holding the control stick 200 with one hand. Applicant has constructed and tested a device corresponding to the control bar 200 described herein.

Figure 9:
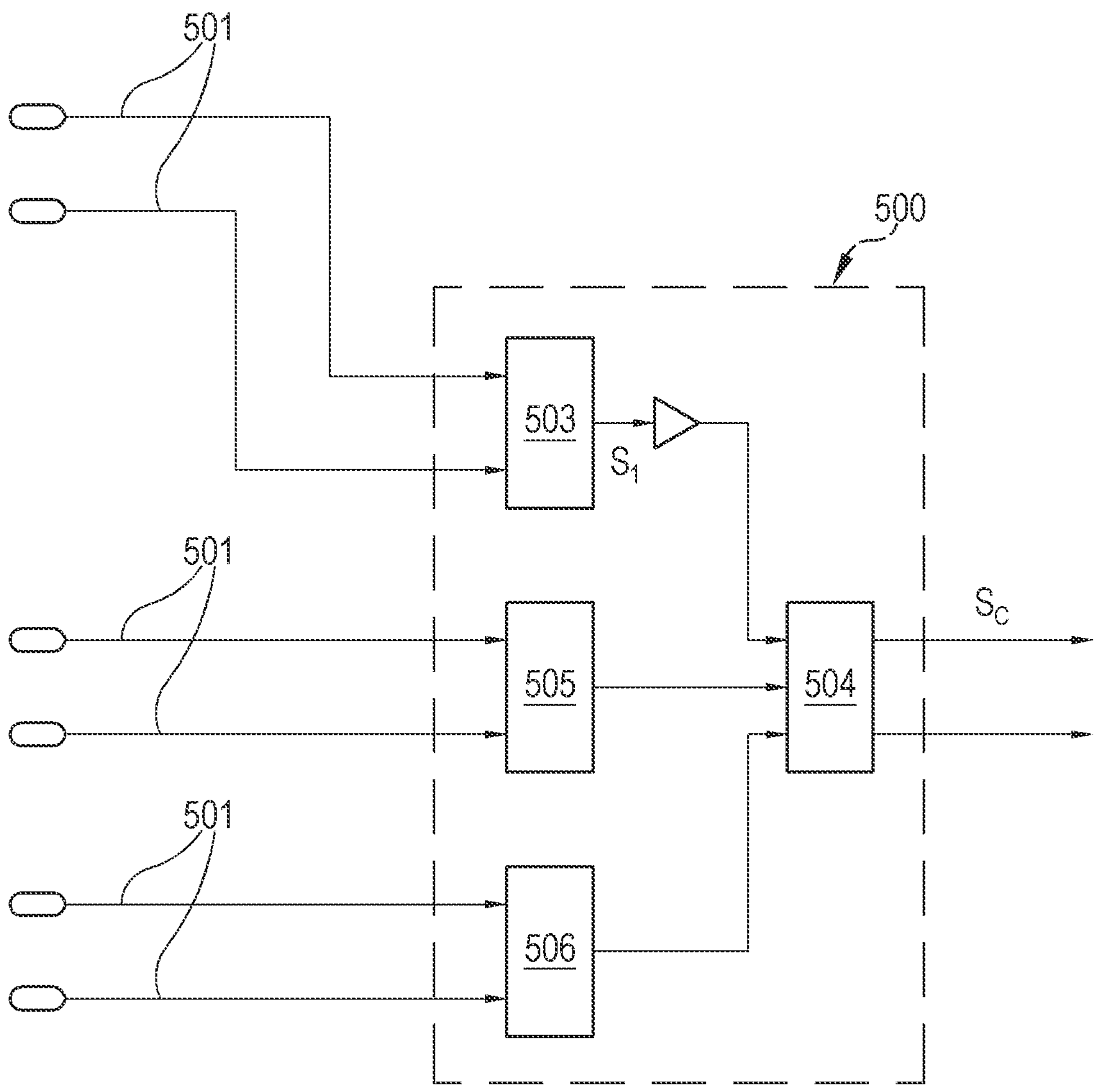
FIG. 9 shows an example of an electronic circuit that can be associated with the control bar.

According to the example, the control bar 200 is suitable for cyclic control. Cyclic control famously involves controlling the roll (tilt to the right or left) and pitch (tilt forward or backward) angles of the aircraft. FIG. 9 also shows a collective control bar 400 that may be implemented by employing one or more sensors 100.

As is well known, collective control controls the lift generated by the main rotor of the aircraft. In a level flight, when the helicopter is tilted forward, the collective control also serves to adjust the forward speed. The pilot can hold the collective control bar 400 with one hand and the cyclic control bar 200 with the other hand.

Figure 3:
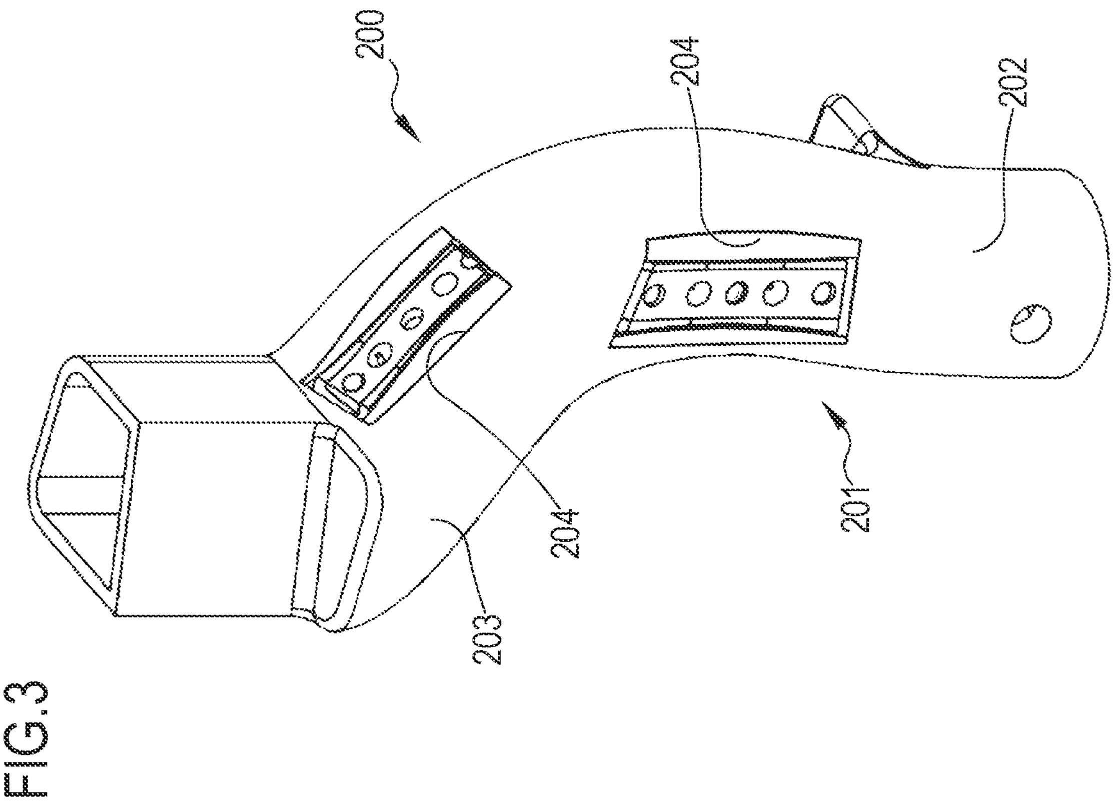
FIG. 3 shows an example of an outer casing of said control bar.

The control bar 200 (FIGS. 2 and 3) includes an outer casing 201 that is, preferably, curved and hollow so as to accommodate the components described below.

For example, the outer casing 201 is obtained by 3D printing. In addition, the control bar 200 is provided with a control head 210 on which control buttons or further sensors are mounted, also of a conventional type, which are not represented.

Figure 7:
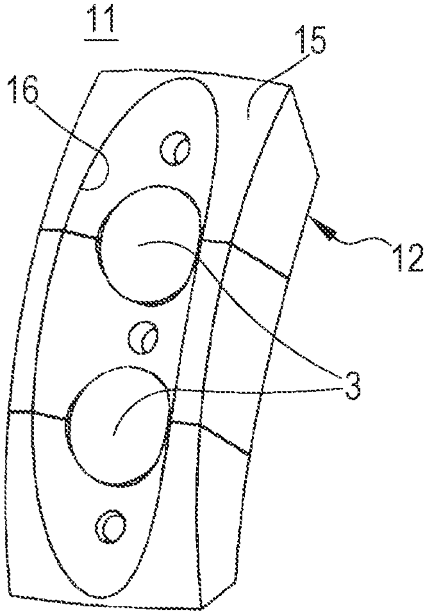
FIGS. 7 and 8 show, respectively, a front view and a rear view of one of said load cells of the control bar.

According to the embodiment considered, the control bar 200 includes four load cells 11, each including a support structure 12 (FIG. 7) configured to support two elastically deformable elements 3 and two related photoresistors 4.

Figure 5:
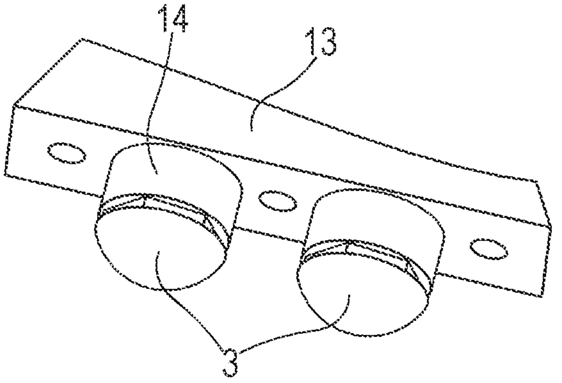
FIG. 5 shows a support base of two photoresistors with relative elastically deformable elements of one of said load cells.
Figure 6:
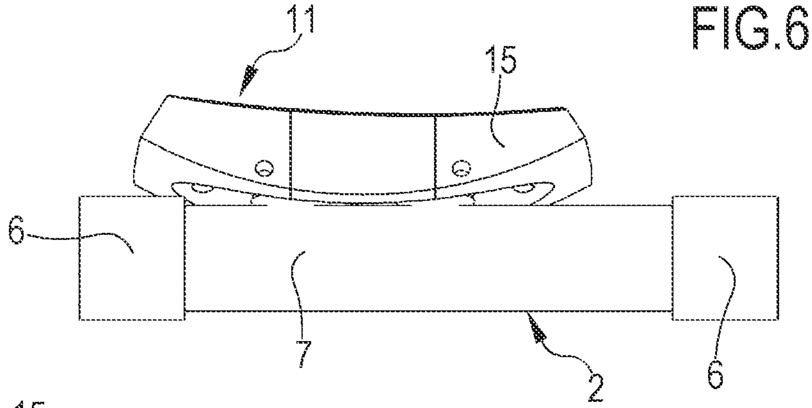
FIG. 6 shows one of the load cells and one of the optical guides housed in the casing of the control bar.

The support structure 12 includes a support block 13 (FIG. 5), such as a body having a substantially rectangular base provided with two housings 14 (e.g., cylindrical in shape) for relative photoresistors 4 upon which corresponding elastically deformable elements 3 are attached.

In addition, the support structure 12 is provided with a fastening frame 15 (FIGS. 7-8) that mechanically couples to the support block 13 so as to hold the photoresistors 4 and associated elastically deformable elements 3 in place.

According to a particular embodiment, the fastening frame 15 comprises three separate modules which when assembled adequately secure the two photoresistors 4 to the corresponding support block 13. The fixing frame 15 identifies a concave wall 16 with holes from which the two elastically deformable elements 3 emerge. On a wall 17 of the support block 13, opposite to the concave wall 16, there are holes 18 that allow electrical conductors to access the terminals 9 and 10 of each photoresistor 4.

Figure 4:
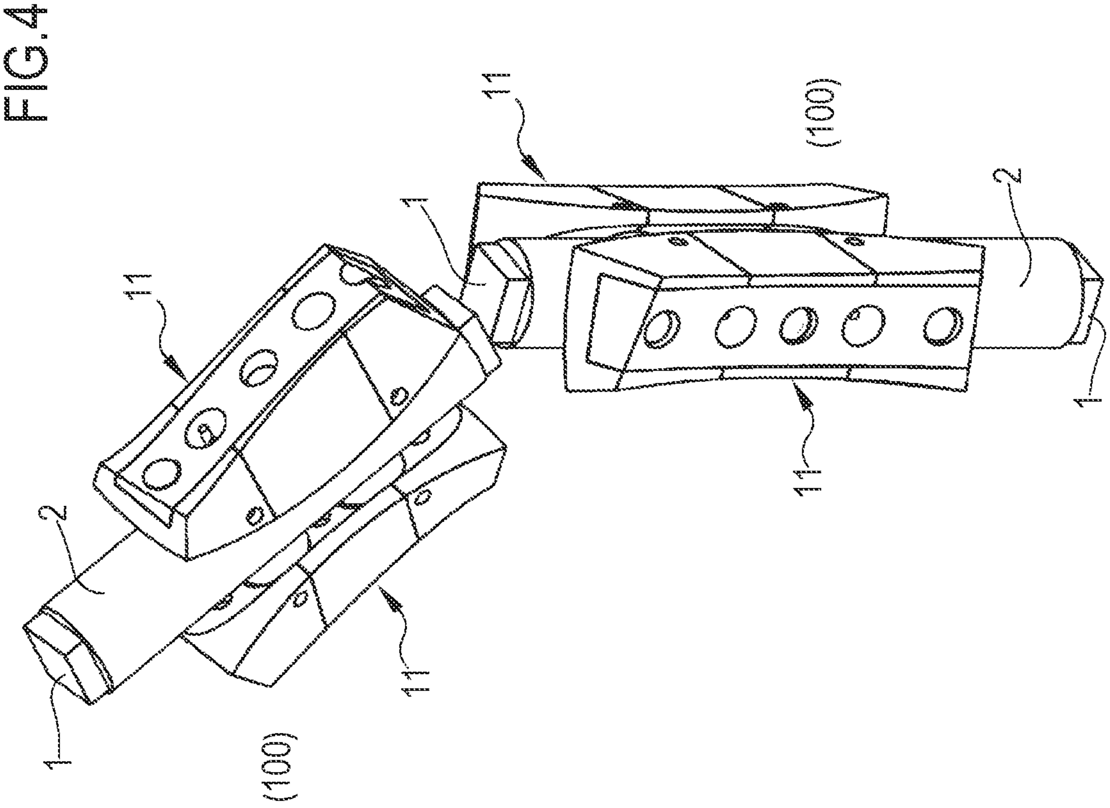
FIG. 4 shows load cells and optical guides housed in said enclosure.

As depicted in FIG. 4, the four load cells 11 are arranged within the enclosure 201 such that two of the four load cells 11 cooperate with an optical guide 2, while two other load cells 11 cooperate with another optical guide 2. In particular, the concave wall 16 accommodates part of the waveguide 2 allowing contact with the elastically deformable elements 3.

In particular, the housing 201 includes a lower portion 202 and an upper portion 203. According to the described embodiment, the lower portion 202 houses a relative optical guide 2 and two load cells 11 arranged on opposite sides from the optical guide itself. For example, one of the two load cells 11 is arranged on the left side, while the other load cell 11 is placed on the right side of the housing 201 (where in defining left and right refers to the viewpoint of the pilot sitting in the chair 300).

According to this implementation form, the upper portion 203 houses another optical guide 2 and two other load cells 11 arranged on opposite sides of the optical guide itself. For example, one of the two load cells 11 is disposed in an anterior position (i.e., on a side of the housing 201 facing the pilot) while the other load cell 11 is disposed in a posterior position (i.e., on a side of the housing 201 facing in a direction opposite to where the pilot is sitting in the chair 300).

In accordance with the foregoing, the load cells 11 placed on the sides of the lower portion 202 of the enclosure 201 provide for controlling the lateral inclinations of the helicopter, while the load cells 11 arranged in the upper portion 203 provide for controlling the roll and pitch angles.

The enclosure 201 provides, at each load cell 11, an opening 204 (FIG. 3) from which the pilot's hand can act on the wall 17 of the load cell itself.

In addition, the four load cells 11 are housed in the openings 204 so that, upon exerting pressure on them, they can make a linear movement of approaching the corresponding optical guide 2 and upon ceasing to exert such pressure, regain their initial position. According to one example, such apertures 204 may be employed to insert load cells 11.

The housing 201 may comprise locking means arranged to prevent lateral displacement of the load cells 11 or release of the load cells 11 from the apertures 204, for example, such locking means may be formed with suitable form-fitting couplings and/or comprise elements that hinder release of the load cells 11 (e.g., plates held in place by magnets).

In particular, the magnitude of the displacements of the load cells 11 is limited to linear movement toward the optical guide 2 associated with deformation of only the elastically deformable elements 3.

Note that the arrangement of the four load cells 11 within the housing 201 described above allows the hand and fingers of the driver to act fully on the control bar 200.

Further, it should be noted that advantageously, each of the load cells 11 has a sufficiently large size to allow for a slight change in hand position, which can occur when the pilot, for example, presses a button on the cloche head without loss of sensitivity for the load cells. In other words, the hand movements on the control bar 200 required to press a button, for example, are not sufficient to move out of the area of competence of the load cells 11. Thus, under normal use, the pilot can make all normally necessary movements without the load cell losing contact with the hand.

According to the form of implementation described herein of the bar 200, the optical waveguide 2 is a cylindrical plexiglass rod having a circular cross section having a diameter of 12 mm. The light sources 1 are two blue LEDs having a diameter of 5 mm, held in place by 3D printed adapters 6.

The choice of the blue color for the LEDs 1 is the result of a test performed by the Applicant using five different colors of LEDs (white, green, yellow, blue, red) to determine to which color the photoresistor 4 was most sensitive, in particular, in terms of minimum detectable brightness and sensitivity to changes in brightness.

The following describes how to determine the critical angle, i.e., the limiting angle to obtain the total internal reflection condition, with reference to example materials.

From Snell's law we obtain:

$$\frac{\sin(\alpha_r)}{\sin(\alpha_i)} = \frac{n_1}{n_2}$$

where:

- $\alpha_r$ is the angle of the reflected radiation beam, which is set to 90° to find the limiting angle;
- $\alpha_i$ is the angle of incidence of the radiation beam to be determined;
- $n_1/n_2=1.5$ is the refractive index of the plexiglass with respect to air;

With these conditions, the critical angle obtained is $\alpha_{i-cr}=42°$.

It should also be noted that even if a total internal reflection is not realized, the functionality of the sensor 100 is not compromised because the load cells 11 make a measurement of a relative value and the zero value can be set at each initialization.

With regard to the choice of photoresistor 4, it should be noted that a photoresistor having a suitably wide operating range for this application is the GM5549 type.

FIG. 9 schematically shows an example of an electronic circuit 500 external to the control bar 200 and connected thereto by conductors 501 extending within a support lever 502 supporting the control bar itself.

The electronic circuit 500 includes a first measurement and processing module 503 connected to the photoresistors 4 and configured to perform, as already mentioned, the measurement of voltage drop or resistance and generate (after an analog-to-digital conversion) a signal S1 representative of the quantities of interest. The first module 503 is, for example, connected to one or all of the load cells 11 with which the control bar 200 is equipped.

The first module 503 may be configured to evaluate, for each load cell 11, the overall voltage drop across the two photoresistors 4 electrically connected in series, or it may be configured to evaluate the voltage drop across the individual photoresistor 4 of each cell. It is possible that the first module 503 is configured to average the pressure values obtained from each photoresistor 4 of a load cell 11.

The signal S1 representative of the quantity of interest (such as, for example, the roll or pitch angle), after any amplification performed by an amplifier G, is provided to an electronic output module 504 that generates appropriate control signals Sc to be provided to actuators or other components of a driving simulator. The amplifier G may be integrated output electronics module 54.

In accordance with the described example, the electronic circuit 500 further includes a second measurement and processing module 505 connected to other devices that may be provided to the control head 210 associated with the control bar 200. For example, signals provided to the second measurement and processing module 505 may be obtained from additional sensors that conventionally detect a tilt or orientation assumed by the control bar 200.

A third measurement and processing module 506 may be provided that receives signals from other control devices integrated into the control head 210, for example, load cell calibration knobs. The electronic circuit 500 may be implemented by a microcontroller also capable of providing the appropriate power supply to the LEDs 1.

Note that in the event that part of the functional blocks of the electronic circuit 500 is integrated within the control bar 200 (or within the same housing as the sensor 100), it is possible that the measured, pressure-dependent quantities exerted on the load cells 11 may be transmitted wirelessly to an external processing module.

Note that the control bar 200 described above is only one possible example of an implementation of the sensor 100, which can be applied in different fields. Indeed, the sensor 100 can be used in any process or activity involving human-machine coupling and can be placed in an input device of a machine of various types to detect human interaction with it.

Possible examples of such input devices are: the steering wheel of a car, the input sticks of a bulldozer and/or any other construction vehicle, the input sticks of aircraft or rotorcraft, power tools.

With regard to the detectable quantities, the sensor 100 allows the acquisition of a real-time dataset and information relating, in addition to the pressure exerted on a surface, also to a local force and a direction of the applied force. The determination of the direction is done, for example, by differential reading of the load on the photoresistors 4 of a single load cell 11 and comparison with the others.

Figure 8:
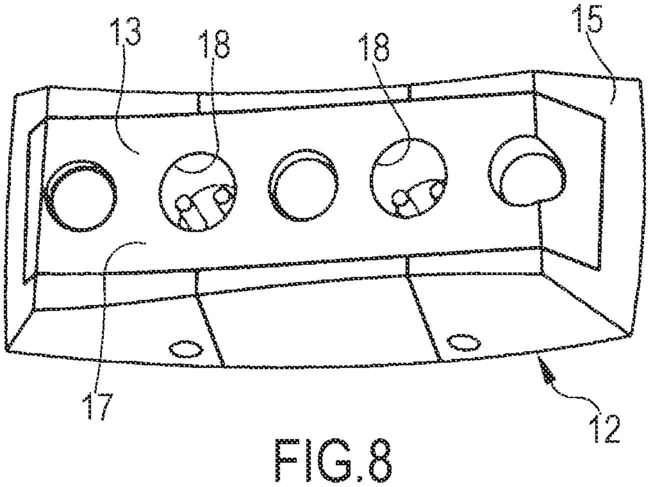

Sensor 100 is particularly advantageous for this type of application because it makes it possible to detect hand activity on the device by distinguishing unwanted from voluntary actions and allowing unwanted actions to be corrected. In fact, the sensor 100 makes it possible, for example, to detect a loss of grip or warn the user of an incorrect hand position. This is achieved by detecting activity (i.e., pressure exerted) at the point of contact between the hand and the control input (according to the example, the back of the load cell 11, as shown in FIG. 8), avoiding the effect of kinematic chains and being able to detect even actions that are not normally detectable. For example, small displacements that fall within a control dead zone but could be symptomatic of fatigue, tension, or general loss of control of the command can be revealed. It is also possible to distinguish a command resulting from accidental impact with the control bar 200 from an intentional command based on the point of application on the control bar itself, since what is detected is the actual control action and not its effect on the input device.

In addition, sensor 100 allows for a real-time dataset that does not interfere with the user's lived experience: because of the sensor's operating principle, its displacement is almost negligible.

Another area of application for the sensor 100 is in improving the training and muscle recovery experience.

Sensor 100 can be integrated into training and physiotherapy devices to collect information on improved exercise execution in terms of accuracy, speed, force exerted and regularity of movement, while also providing a time history and quantification of the improvement.

Note that this scope is not limited to hand exercises, but is easily extendable to training and recovery of muscles such as the pelvic floor or others. This is also due to the fact that no wearable sensing parts are required, and all components necessary for sensing muscle activity can be arranged within the training device.

The sensor of the present invention is particularly advantageous because the sensor can be completely integrated into the device of interest without altering the user experience.

Furthermore, because in the sensor 100 the activity is monitored right in the area of pressure application, and not after a possible kinematic chain, a more accurate and reliable measurement is achieved.

Note that each photoresistor 4 has only two leads carrying the output signal, and this output signal does not necessarily require conditioning operations. In addition, the sensor 100 does not present any problems related to signal timing even in the situation where multiple load cells 11 are working together.

Furthermore, due to the use of optical components, the measurement is not altered by changes in electromagnetic fields or temperature variations.

FIGURE NUMBER LEGEND optical pressure sensor 100
optical radiation source 1
optical guide 2
elastically deformable element 3
photoresistor 4
adapter 6
outer wall 7
first face 8
first electric terminal 9
second electrical terminal 10
load cell 11
support structure 12
support block 13
seat 14
fixing frame 15
concave wall 16
wall 17
hole 18
control bar 200
outer casing 201
lower portion 202
upper portion 203
opening 204
control head 210
chair 300
collective control bar 400
electronic circuit 500
conductor 501
support lever 502
first measuring and processing module 503
signal S1
amplifier G
output electronic module 504
control signals Sc
second measuring and processing module 505
third measuring and processing module 506

The invention claimed is:

1. An optical pressure sensor comprising:

an optical radiation source configured to emit an optical radiation;

an optical guide optically coupled to the optical radiation source and configured to achieve a total internal reflection condition, the optical guide defining an interface wall to the outside;

an elastically deformable element configured to be transparent to the optical radiation and having a first face that is facing the interface wall and a second face, the elastically deformable element being further configured such that in the presence of a pressure exerted on the elastically deformable element, a contact area between the elastically deformable element and the interface wall is modified so that the optical guide assumes a condition of total internal frustrated reflection with emission of an output optical radiation towards the first face of the elastically deformable element dependent on the pressure exerted and on the contact area; and a photoresistor optically coupled to the second face of the elastically deformable element and configured to provide an electrical signal dependent on the output optical radiation;

wherein the optical radiation source includes at least one LED;

wherein the optical guide includes a cylindrical guide optically coupled to the at least one LED;

wherein the first face of the elastically deformable element hemispherical and the second face of the elastically deformable element is flat to define a second flat face, wherein the photoresistor is fixed to the second flat face; and wherein the output optical radiation is a function of an area of a contact surface between the first face of the elastically deformable element and the interface surface.

2. The optical pressure sensor according to claim 1, further comprising an electronic circuit connected to the photoresistor, wherein the electrical circuit is configured to:

provide a readout signal to the photoresistor and receive the electrical signal dependent on the output optical radiation; and process the electrical signal dependent on the output optical radiation and provide information of interest (Sc) associated with the pressure exerted.

3. The optical pressure sensor according to claim 1, wherein the optical guide is a plexiglass cylinder, and wherein the elastically deformable element is made of silicone rubber.

4. The optical pressure sensor according to claim 1, wherein the at least one LED comprises a first LED disposed at one end of the optical guide and a second LED disposed at another end of the optical guide.

5. The optical pressure sensor according to claim 1, wherein the elastically deformable element comprises a plurality of elastically deformable elements; wherein the photoresistor comprises a plurality of photoresistors; wherein a second one of the elastically deformable elements is transparent to the optical radiation and has a respective first face facing the interface wall and a respective second face, wherein the presence of a pressure exerted on the second one of the elastically deformable elements, causes a modification of a corresponding contact area between the interface wall and the second one of the elastically deformable elements so that the optical guide assumes a condition of total internal frustrated reflection with emission of a further output optical radiation towards the first face of the second one of the elastically deformable elements responsive to the relative pressure exerted and on the corresponding contact area; and wherein a second one of the photoresistors is optically coupled to the second face of the second one of the elastically deformable elements and configured to provide a further electrical signal dependent on the further optical output radiation.

6. The optical pressure sensor according to claim 5, further comprising an electronic circuit configured to provide a further readout signal to the second one of the photoresistors and process the further electrical signal and provide a relative information of interest associated with the relative pressure exerted.

7. The optical pressure sensor according to claim 5, wherein the plurality of photoresistors are electrically connected in series.

8. The optical pressure sensor according to claim 1, further comprising:

a load cell including a support structure configured to house the elastically deformable element and the photoresistor; and an outer casing configured to house the optical guide and having an opening configured to house the load cell allowing displacements relative to the optical guide under the action of the pressure exerted.

9. The optical pressure sensor according to claim 8, wherein the support structure includes a seat for the photoresistor and is configured such that the first face of the elastically deformable element protrudes towards the interface wall, and wherein the support structure identifies a concave surface suitable to accommodate at least part of the optical guide.

10. The optical pressure sensor according to claim 1, wherein the sensor is configured such that the pressure exerted is produced as a result of at least one action that includes action of a user's hand on a handle and action of a user's pelvic floor.

11. The optical pressure sensor according to claim 10, wherein the sensor is configured to operate as at least one of a cyclic control bar of an aircraft and a collective control bar of an aircraft.

12. The optical pressure sensor according to claim 1, wherein the optical pressure sensor is configured to operate in conjunction with at least one of a steering wheel of a car, input stick of a bulldozer, input stick of a construction vehicle, input stick of an aircraft or autogyro, and a power tool.

13. The optical pressure sensor according to claim 1, wherein the optical pressure sensor is configured to operate in conjunction with at least one of a training device and physiotherapy device.

* * * * *